Oct. 29, 1968  H. NUSBAUM  3,407,660
LIQUID LEVEL DETERMINING DEVICE
Filed Jan. 17, 1967
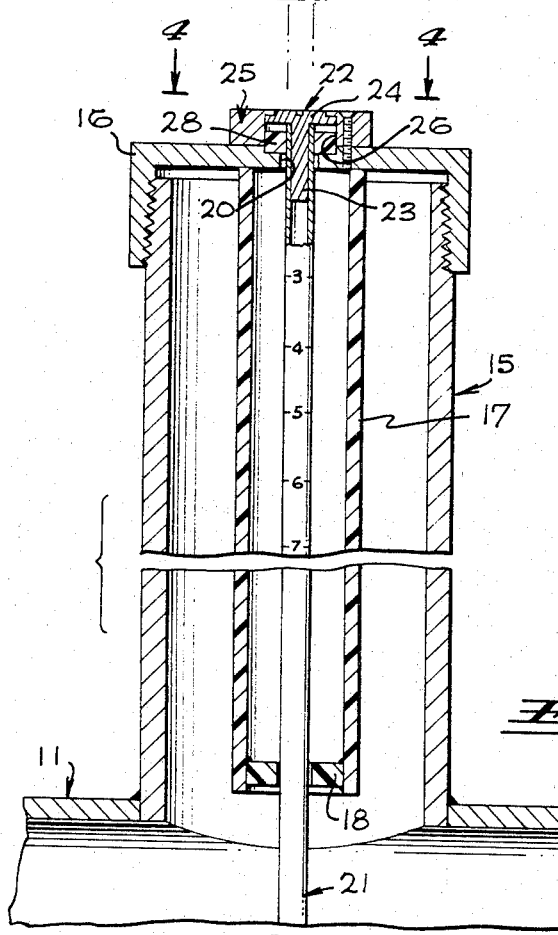
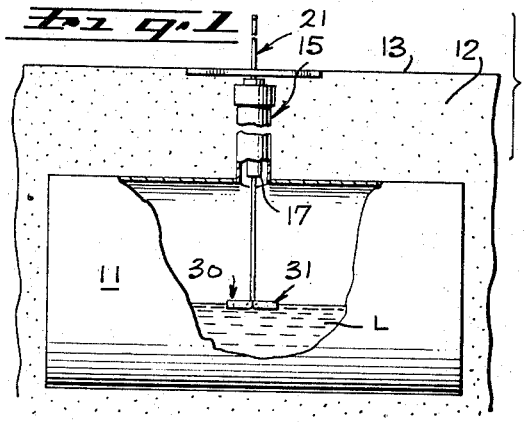
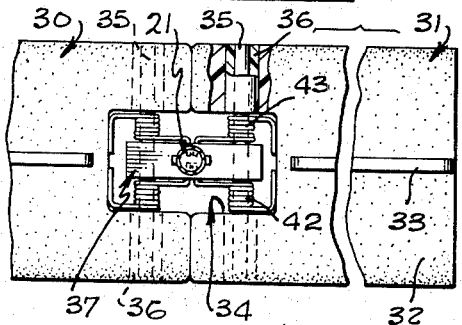
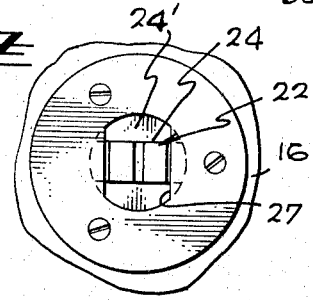
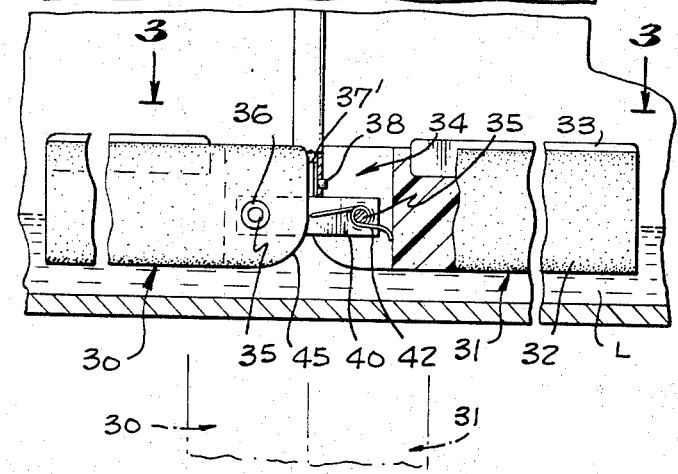
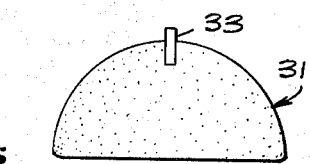
INVENTOR
HENRY NUSBAUM
BY
Mason & Graham
ATTORNEYS

United States Patent Office 3,407,660
Patented Oct. 29, 1968

3,407,660
LIQUID LEVEL DETERMINING DEVICE
Henry Nusbaum, Los Angeles, Calif., assignor to Roylyn Incorporated, Glendale, Calif., a corporation of California
Filed Jan. 17, 1967, Ser. No. 609,887
3 Claims. (Cl. 73—311)

ABSTRACT OF THE DISCLOSURE

A liquid level measuring stick with a stem and a pair of normally extended inwardly collapsible float members for use in a tank having a smaller access hole than the width of the extended float members.

This invention has to do with devices for measuring the level of liquid in an underground storage tank or the like.

An object of the invention is to provide a new and improved liquid level determining means of the type embodying a boat at the lower end of a rod or "stick" designed to cause the stick to project from the tank by a distance which is in direct proportion to the liquid level in the tank.

Another object of the invention is to provide a new and improved liquid level measuring stick means having a novel collapsible float construction designed to permit the introduction and removal of the device through a tube or opening which is much smaller in diameter than the normal over-all size of the float.

Still another object of the invention is to provide a device of the type indicated embodying a collapsible float in which spring means is employed for automatically opening the float and holding it open or in operative position and further, such a float which can be readily removed from the tank without the use of any special tools or the like for collapsing it.

These and other objects will be apparent from the drawing and the following description. Referring to the drawing:

FIG. 1 is a somewhat diagrammatic view of a liquid storage tank shown in the ground and fitted with a liquid level measuring device of the invention;

FIG. 2 is a fragmentary sectional elevational view of the portion of the tank in which the device of the invention is mounted and showing the device therein in elevation and partly in section, but on a larger scale than FIG. 1;

FIG. 3 is a sectional plan view on line 3—3 of FIG. 2;

FIG. 4 is a plan view on line 4—4 of FIG. 2;

FIG. 5 is an end elevational view of a float on line 5—5 of FIG. 4.

More particularly describing the invention, numeral 11 generally designates an underground storage tank of metal which is shown in the ground 12, the surface of which is designated 13. The tank is provided with a neck or elongated vertical pipe 15 which extends from the tank almost to the surface of the ground and this is shown closed by an internally threaded cap 16. The latter is provided with a depending tube 17 which extends a substantial distance down through the pipe and is provided at its lower end with an annular, inwardly extending guide flange 18. The cap has a central opening 20 adapted to receive and pass a measuring or level stick 21 which also passes through the guide flange 18 and is of a length sufficient to extend substantially to the bottom of the storage tank. The stick 21, so called, may be a solid member, but preferably is a cylindrical tube as shown. The upper end of the stick is provided with a locking member 22 which includes a shank 23 within the tube and a disk-like upper portion 24 which is elongated with stepped rounded end portions 24' curved about a common radius. This member is received within a locking cover member 25 which is secured to the cap and which has a bore 26 extending from its lower surface to the exterior except that at its outer end there are two side portions 27 in the nature of inwardly projecting flanges or lips under which the end portions of the locking member 22 can be positioned as shown in FIG. 4. A seal ring 28 is provided in the assembly. The parts 22 and 25, 27 may be described as interengaging means on the stick and the cap for releasably locking the stick in place.

It is a particular feature of the invention that the measuring stick 21 is provided with a float 30 of novel construction in which the float normally is considerably larger in lateral extent than the opening in the pipe 15 through which the float must be passed to install it in the tank or remove it therefrom. The float comprises a pair of float elements 30 and 31, each of which is preferably made of a suitable plastic, such as a polyurethane foam body 32 with aluminum or other suitable stiffening rib 33. Each float element is formed to be generally half circular segment in plan and to have a recess 34 in its inner edge adjacent the stick 21. A pin 35 extends across the recess and has its end journaled in bushings 36 which are of Teflon or other suitable material embedded in the material of the float.

The float members are mounted pivotally on the stick by means of a bracket 37 which includes a central tubular portion 37' which is received in the lower end of the stick 21 and secured thereto, as by a retainer 38. The main body 40 of the bracket extends laterally of the measuring stick into the recesses of the floats and is apertured to receive the pins 34. Each float is provided with a pair of coil springs, designated 42, 43, the inner ends of which are secured in the bracket and the outer ends of which are turned downwardly and outwardly against the body of the float at the inner wall of the recess. With this construction the floats are urged upwardly to the position in which they are shown and since their inner edges abut, their movement is limited to this position. However, it will be noted that the lower edges of the inner edges of the floats are rounded at 45 so that the floats can be pivoted downwardly against the force of the springs for insertion or removal through the neck or pipe 15 of the tank when the cap 16 is not in place.

In the operation of the apparatus, with the device in the position shown in FIG. 2, the stick 21 may be pressed in slightly to permit the locking member 22 at the top to be turned 90° to release the stick which will then rise as the float 30 rises to the top of the liquid L in the tank 11. Suitable indicia are provided on the stick, as shown in FIG. 2, so that a reading can be taken indicative of the liquid level or the amount of liquid in the tank. The device may be removed from the tank for servicing by taking off the cap 16 from the pipe 15, the float elements pivoting downward as they are pulled up through the pipe. The device is installed by forcibly holding the float elements pivoted downward to parallel the stick until they can be inserted in the pipe 15.

Although I have illustrated and described a preferred form of my inventon, I contemplate that various changes and modifications can be made therein without departing from the invention, the scope of which is indicated by the following claims.

I claim:

1. In a float structure including an elongated member of relatively narrow width and thickness adapted to be mounted upright for guided vertical movement, float means at the lower end of said elongated member comprising a pair of floats, each float being formed of a relatively lightweight material and having a recess in its inner edge adjacent the elongated member, a pin in each float member extending transversely thereof across said recess and journaled at its ends in the float member, a bracket secured to the lower end of said elongated member and extending laterally thereof into the recesses of said floats and receiving said pins, and spring means between each float and said elongated member urging said floats to a position normal to the longitudinal axis of the elongated member, said floats having inner edge portions engaging in such position and preventing further pivotal movement thereof, said floats being pivotable against said spring means to a position such that they lie with their longitudinal axes parallel to the longitudinal axis of the elongated member.

2. In a liquid level determining device for use in a tank having a top opening, a cap closing said opening and having a smaller opening to pass a measuring stick, a measuring stick extending through said smaller opening in the cap and reaching substantially to the bottom of the tank, interengaging means on the upper end of said stick and on said cap for releasably locking said stick in place within the tank, and a collapsible float mounted at the lower end of said stick and passable, when collapsed, through said top opening, said float comprising two float elements individually pivotally mounted at the lower end of said stick on axes normal to the longitudinal axis of the stick, and spring means yieldably urging said floats to a position generally normal to the longitudinal axis of the stick.

3. The device set forth in claim 2 in which the pivotal axes of the individual float elements are parallel and laterally spaced and on opposite sides of the longitudinal axis of the stick.

References Cited

UNITED STATES PATENTS

| | | | |
|---|---|---|---|
| 1,162,916 | 12/1915 | Harrison | 73—322 X |
| 1,525,294 | 2/1925 | Guint et al. | 73—311 |
| 1,531,200 | 3/1925 | Lehr | 73—322 X |
| 2,117,933 | 5/1938 | Bacon | 73—311 |
| 2,129,984 | 9/1938 | Bacon. | |
| 2,738,675 | 3/1956 | Blair | 73—322 |

S. CLEMENT SWISHER, *Acting Primary Examiner.*

D. M. YASICH, *Assistant Examiner.*